United States Patent [19]

Foster

[11] 3,856,265
[45] Dec. 24, 1974

[54] TENSIONING DEVICE

[76] Inventor: Howard F. Foster, 1050 N.W. 55th St., Fort Lauderdale, Fla. 33505

[22] Filed: July 30, 1973

[21] Appl. No.: 383,587

[52] U.S. Cl.............. 254/161, 24/269, 248/361 A
[51] Int. Cl...................... A63b 61/04, B65d 63/00
[58] Field of Search........ 254/51, 52, 161; 24/68 D, 24/68 R, 19, 71.2, 269; 140/93.2, 108; 248/361 A; 242/96, 107.6

[56] References Cited
UNITED STATES PATENTS

| | | | |
|---|---|---|---|
| 940,423 | 11/1909 | Barclay | 254/161 |
| 3,416,763 | 12/1968 | Moreno | 254/161 |
| 3,638,912 | 2/1972 | Moreno | 254/161 |
| 3,673,642 | 7/1972 | Harwell | 254/161 |
| 3,747,288 | 7/1973 | Grimelii | 24/269 X |

Primary Examiner—Al Lawrence Smith
Assistant Examiner—Robert C. Watson
Attorney, Agent, or Firm—Oltman and Flynn

[57] ABSTRACT

A tensioning device for a flexible element, such as a strap or cable. The tensioning device has a frame with spaced, parallel legs having axially aligned openings, an apertured bolt extending through the openings and having a polygonal head at one end outside one leg of the frame, and a nut on the other end of the bolt at the outside of the other leg to retain the bolt against axial movement. The one leg of the frame has an outwardly offset free end which presents two or more flat edges for locking engagement with the flats on the bolt head.

3 Claims, 6 Drawing Figures

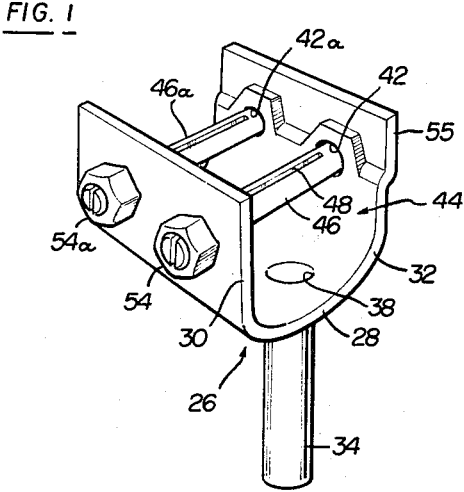
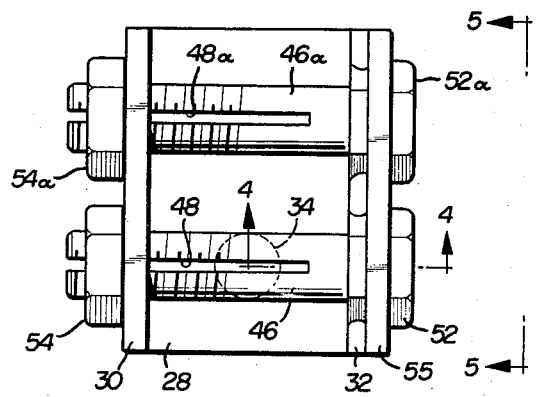
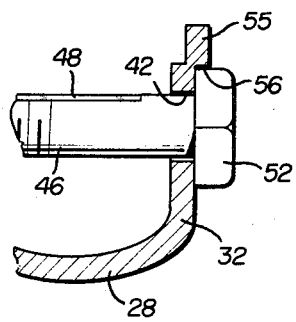
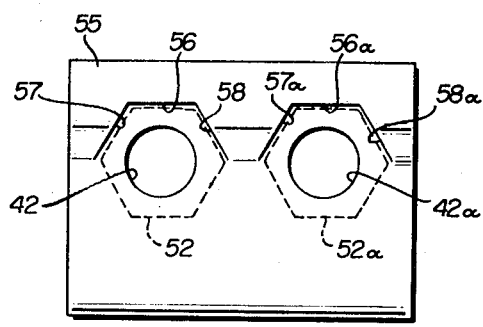

TENSIONING DEVICE

BACKGROUND OF THE INVENTION

Certain known tensioning devices for tensioning flexible elements, such as straps, belts, wires, cable and the like, have included a stem and a frame having spaced, parallel legs with axially aligned openings therein which have had a non-round shape that is usually a square shape. A bolt goes through the openings, and it has a portion with a square shape corresponding to the openings so that it can be axially shifted into one of the openings. A fracturable washer has been provided adjacent the square portion of the bolt to keep it out of the corresponding square opening until sufficient pressure is applied to fracture the washer. Such a fracturable washer has proved to be unnecessary.

In my copending U.S. patent application Ser. No. 248,892, now U.S. Pat. No. 3,754,733 filed May 1, 1972, I have disclosed and claimed an improved tensioning device which overcomes disadvantages and practical limitations in the previously known devices of this general type.

SUMMARY OF THE INVENTION

The present invention is directed to a novel tensioning device which follows the essential teachings of my aforementioned U.S. patent application Ser. No. 248,892, and now U.S. Pat. No. 3,754,733 but which represents an improvement over the latter in its capacity to withstand tension without becoming deformed or otherwise damaged.

Accordingly, it is a principal object of this invention to provide a novel and improved tensioning device for straps, cables or other flexible elements.

Another object of this invention is to provide such a tensioning device which follows the essential teachings and embodies the advantages of the invention disclosed and claimed in my aforementioned U.S. patent application Ser. No. 248,892, but is capable of better withstanding tensioning forces without deformation.

Another object of this invention is to provide such a tensioning device in which a bolt-receiving, generally U-shaped frame has an outwardly offset free end on one leg which extends substantially parallel to the remainder of that leg and presents flat edges for engagement by corresponding flats on the head of the bolt to prevent the bolt from turning when the bolt head is held against the outside of that leg of the frame.

Further objects and advantages of this invention will be apparent from the following detailed description of certain presently-preferred embodiments thereof, which are illustrated in the accompanying drawing, in which:

FIG. 1 is a perspective view of a two-bolt tensioning device in accordance with the present invention;

FIG. 2 is a top plan view of this device;

FIG. 3 is an elevational view taken from the right end of FIG. 1;

FIG. 4 is a fragmentary cross-section taken along the line 4 — 4 in FIG. 2;

FIG. 5 is an elevational view taken from the line 5 — 5 in FIG. 2, with the bolt heads shown in phantom; and FIG. 6 is a perspective view showing a one-bolt tensioning device in accordance with this invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the terminology employed herein is for the purpose of description and not of limitation.

The present tensioning device is useful for tensioning flexible elements, such as the strap or belt shown in phantom in FIG. 3, or a wire, or a cable. The flexible element may be a tie-down for a trailer, by way of example. The present tensioning device is ordinarily made entirely of metal.

The tensioning device includes a substantially U-shaped frame 26 having a base 28 and two spaced, substantially parallel legs 30 and 32 extending perpendicularly from the base 28. A stem 34 is affixed by welding to the base 28 of the frame in an opening at 38. The stem 34 could be threadably attached to the base 28. The lower end of the stem 34 is not shown, but it ordinarily carries a screw anchor which can be embedded in the ground. Alternatively, the lower end of the stem may be threaded to screw into a separate ground anchor.

The legs 30 and 32 respectively have circular openings 40 and 42 which are aligned axially with each other across the space 44 between the legs. As apertured bolt 46 can be inserted into the openings 40 and 42 to extend through the openings with the aperture 48 of the bolt disposed between the opposite legs 30 and 32 of the frame. The aperture 48 may be a slot, as shown, for receiving a flexible strap, or it may be a smaller opening when a wire or cable is the flexible device to be tensioned.

The bolt 46 has threads 50 at the left end as viewed in the drawing and an enlarged hexagonal head 52 at the right end as viewed in the drawing. A net 54 screws onto the threads 50 at the outside of the frame leg 30 and may be drawn tight against the leg 30 so that the head 52 is pulled against the outside of the other frame leg 32. This keeps the bolt from shifting axially in the openings 40 and 42. However, the nut 54 is initially loose on the far left end of the bolt 46 or off the bolt entirely.

In accordance with the present invention the free (upper) end of the frame leg 32 is offset laterally outward (in a direction away from the opposite frame leg 30) to provide a flat segment 55 that extends parallel to the remainder of leg 32. At the juncture between this outwardly-offset segment 55 and the remainder of the leg 32 there are provided three adjoining, hexagonally arranged, flat edges or shoulders 56, 57 and 58, as best seen in FIG. 5. The edge 56 extends horizontally across the top of the opening 42 and the edges 57 and 58 extend down from the opposite ends of edge 56 at oppositely inclined 120 degree angles. Each edge 56, 57 and 58 is elongated perpendicular to the conjoint axes of the opening 42 and the bolt 46, and each is spaced outward from these conjoint axes by just slightly more than the radius of a corresponding flat edge on the bolt head 52, shown in phantom in FIG. 5. Consequently, when the bolt head 52 is held flush against the outside of the frame leg 32 (by the nut 54 on the opposite end of the bolt), the three-sided upper half of the bolt head is snugly received in the three-sided, semi-hexagonal, downwardly-facing recess provided by the transverse edges 57, 56 and 58 on the frame leg 32. Therefore, these edges lock the bolt head against turning.

With this novel construction at the offset portion 55 the frame leg 32 presents more than one transverse locking surface for engagement by the bolt head, and all of these locking surfaces act simultaneously on the bolt to oppose its tendency to rotate as a result of tension on the strap, cable or other flexible tensioning element. Also, the offset portion 55 which provides these transverse locking surfaces 56 – 58 has its maximum thickness, and therefore its maximum structural rigidity, perpendicular to the locking surfaces, and this enhances its ability to withstand heavier tension loads without becoming deformed thereby.

In the embodiment of FIGS. 1 – 5, the tensioning device has a second apertured bolt 46a spaced from the previously described bolt 46 and arranged to tension a second strap, cable or other flexible tensioning element. This second bolt 46a carries a nut 54a on its threaded left end and has an integral hexagonal head 52a on its right end which coacts with transverse locking surfaces 56a, 57a and 58a formed at the juncture between the offset free end segment 55 and the remainder of the frame leg 32. The construction and arrangement of the various parts associated with the second tensioning bolt 46a are identical to those already described with reference to the first tensioning bolt 46, and a detailed description of these various parts will be omitted as unnecessarily repetitious. Corresponding elements of the second tensioning bolt arrangement are given the same reference numerals, with an *a* suffix added, as those in the first tensioning bolt arrangement.

FIG. 6 shows a second embodiment of the invention in which only a single tensioning bolt 46' is provided. In other respects, the FIG. 6 embodiment is essentially similar to the two-bolt embodiment of FIGS. 1 – 5 and, again, a detailed description of its various structural features is omitted. Elements in the FIG. 6 device which correspond to those in FIGS. 1 – 5 are given the same reference numerals, with a "prime" suffix added.

It is to be understood that, if desired, the free end segment 55 of the frame leg may be offset in such a manner as to provide just a single transverse locking edge for engagement by a flat on the head of the tensioning bolt, or it may provide a pair of such locking edges intersecting at an apex centered above the circular opening 46 in the frame leg 32. The locking edges may be disposed at any desired angular relationship to each other, corresponding to whatever polygonal shape is provided on the bolt head.

I claim:

1. In a tensioning device for a flexible element having a bolt with an aperture therein to receive the end of a flexible element to be wound around a bolt and a polygonal portion with adjoining flat surfaces adjacent one end thereof, a stem, and a frame having a base and substantially parallel legs projecting from the base, the legs having openings which are aligned with each other across the space between the legs so that the bolt is rotatable and axially adjustable in a lateral direction in the openings, the bolt having a nut for the end thereof opposite the polygonal portion, the improvement wherein the entire width of one of said legs at the side of the opening therein is offset laterally outward and substantially parallel to said one leg on the opposite side of said opening and presents only three polygonally disposed, adjoining flat edges which face toward the axis of said opening and are each elongated substantially perpendicular to the axis of said opening and are each spaced from said axis by substantially a radius of said polygonal portion of the bolt to a flat surface thereon to hold three sides of the polygonal portion of said bolt against rotation when said bolt is axially shifted toward the other of said legs, said one leg having no other edges for engaging said polygonal portion of said bolt.

2. A tensioning device according to claim 1, wherein the free end of said one leg is offset laterally outward away from the other of said legs, and said polygonal portion of the bolt is an enlarged polygonal head thereon at the outside of said one leg.

3. A tensioning device according to claim 2, wherein said edges are three in number, adjoining one another and arranged hexagonally around the half of said opening which is toward the free end of said one leg, and said head on the bolt is hexagonal and is substantially complementary to the hexagonal arrangement of said edges.

* * * * *